(12) United States Patent
Mar

(10) Patent No.: US 9,114,881 B2
(45) Date of Patent: Aug. 25, 2015

(54) AIRCRAFT MODULAR COOLING SYSTEM

(75) Inventor: John G. Mar, Wichita, KS (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 13/298,029

(22) Filed: Nov. 16, 2011

(65) Prior Publication Data

US 2013/0118194 A1 May 16, 2013

(51) Int. Cl.
| | |
|---|---|
| *F25B 1/00* | (2006.01) |
| *F25D 17/06* | (2006.01) |
| *B64D 13/08* | (2006.01) |
| *B64D 13/06* | (2006.01) |

(52) U.S. Cl.
CPC ........ *B64D 13/08* (2013.01); *B64D 2013/0618* (2013.01); *B64D 2013/0674* (2013.01); *Y02T 50/56* (2013.01)

(58) Field of Classification Search
CPC ......... B64D 13/00; B64D 13/06; B64D 13/08
USPC ........... 62/115, 426, 498, 499, 237, 371, 382, 62/77
See application file for complete search history.

(56) References Cited

U.S. PATENT DOCUMENTS

| | | | | | |
|---|---|---|---|---|---|
| 2,386,883 | A | * | 10/1945 | Ames | 62/280 |
| 2,486,472 | A | * | 11/1949 | Harris | 236/44 A |
| 2,966,342 | A | * | 12/1960 | Newton | 165/228 |
| 4,272,967 | A | * | 6/1981 | White et al. | 62/236 |
| 4,419,926 | A | * | 12/1983 | Cronin et al. | 454/74 |
| 4,505,129 | A | * | 3/1985 | Yamane et al. | 62/280 |
| 4,865,267 | A | * | 9/1989 | Severson | 244/53 B |
| 4,869,071 | A | * | 9/1989 | Wehner et al. | 62/133 |
| 4,901,538 | A | * | 2/1990 | Anthony | 62/237 |
| 5,383,335 | A | * | 1/1995 | Anderson et al. | 62/89 |
| 6,035,655 | A | * | 3/2000 | Hare et al. | 62/259.2 |
| 6,401,446 | B1 | * | 6/2002 | Gibbons | 60/39.281 |
| 6,637,215 | B1 | * | 10/2003 | Leathers | 62/87 |
| 2005/0034477 | A1 | | 2/2005 | Hu | |
| 2005/0076661 | A1 | * | 4/2005 | Zywiak et al. | 62/244 |
| 2005/0151019 | A1 | * | 7/2005 | Stevens | 244/135 R |
| 2008/0148747 | A1 | * | 6/2008 | Solntsev et al. | 62/120 |
| 2009/0000328 | A1 | | 1/2009 | Scherer et al. | |
| 2009/0107163 | A1 | * | 4/2009 | Lu et al. | 62/291 |

(Continued)

FOREIGN PATENT DOCUMENTS

| | | |
|---|---|---|
| DE | 102009043429 | 5/2011 |
| WO | WO2004112452 | 12/2004 |

(Continued)

OTHER PUBLICATIONS

Extended European Search Report, EP12187769, dated Feb. 27, 2013.

*Primary Examiner* — Cassey D Bauer
*Assistant Examiner* — Kirstin Oswald

(57) ABSTRACT

A modular expandable cooling system including a rack sized for receiving multiple modular cooling units having a ram air inlet connected to a ram air source. The system also includes a modular cooling unit having a housing for receipt in the rack, a ram air inlet and outlet, and a refrigerant inlet and outlet. The system includes a condenser mounted in the housing in fluid communication with the ram air inlet, a compressor mounted in the housing downstream from the condenser, an accumulator in fluid communication with the compressor inlet.

13 Claims, 3 Drawing Sheets

(56) References Cited

U.S. PATENT DOCUMENTS

| | | | |
|---|---|---|---|
| 2009/0229285 A1* | 9/2009 | Sato et al. | 62/149 |
| 2009/0260387 A1* | 10/2009 | DeFrancesco | 62/401 |
| 2011/0017426 A1* | 1/2011 | Baumgardt et al. | 165/59 |

FOREIGN PATENT DOCUMENTS

| | | | | |
|---|---|---|---|---|
| WO | WO 2010106510 A2 | * | 9/2010 | B64D 13/06 |
| WO | WO 2010141254 A1 | * | 12/2010 | F24F 1/02 |

* cited by examiner

AIRCRAFT MODULAR COOLING SYSTEM

GOVERNMENT LICENSE RIGHTS

This invention was made with government support under FA8628-10-D-1000 and FA8107-05-C-0001 awarded by Department of Defense. The government has certain rights in the invention.

BACKGROUND

The present invention generally relates to aircraft cooling systems, and more particularly, to a modular cooling system capable of expanding aircraft cooling system capacity.

Some systems onboard aircraft generate heat, which may negatively impact personnel and computer equipment. Thus, various portions of aircraft must be cooled to maintain appropriate temperatures for passengers, crew, and equipment. Conventional cooling systems have been used to cool the portions of the aircraft that need to be cooled. Although these conventional cooling systems provide adequate cooling when originally installed, over time the aircraft may be retrofitted with improvements and accessories that increase the heat generated onboard the aircraft. The increased heat generation frequently results in an increased need for cooling. In the past when cooling system capacities needed to be increased, cooling packs, engine bleed systems, and/or duct networks had to be replaced to accommodate the increased capacity system. These changes have caused aircraft to be grounded for extended periods while the cooling systems are upgraded. Further, removing entire portions of cooling systems and replacing those portions with upgraded systems results in considerable expense. Thus, there is a need for an aircraft cooling system that permits capacity to be increased without replacing cooling packs, engine bleed systems, and/or duct networks.

SUMMARY

In one aspect, the present invention includes a modular expandable cooling system for use on aircraft having an on-board evaporator through which refrigerant circulates to cool a portion of the aircraft. The cooling system comprises a rack sized for receiving a plurality of modular cooling units. The rack has a ram air inlet connected to a ram air source. The system also comprises a modular cooling unit including a housing sized for receipt in the rack. Further, the unit has a ram air inlet located on the housing for receiving ram air from the ram air inlet when the unit is received in the rack and a ram air outlet positioned downstream from the ram air inlet for exhausting spent ram air from the unit. The unit also includes a refrigerant inlet connectable to an outlet of the evaporator when the unit is received in the rack and a refrigerant outlet connectable to an inlet of the evaporator when the unit is received in the rack. In addition, the unit comprises a condenser mounted in the housing in fluid communication with the ram air inlet having an outlet in fluid communication with the refrigerant outlet and an inlet; a compressor mounted in the housing downstream from the condenser having an outlet in fluid communication with the condenser inlet and an inlet and an accumulator having an outlet in fluid communication with the compressor inlet and an inlet in fluid communication with the unit refrigerant inlet.

In another aspect, the present invention includes a method of increasing cooling system capacity on an aircraft having a plurality of evaporators through which refrigerant circulates to cool a corresponding portion of the aircraft. The aircraft includes a first modular cooling unit connected to a first evaporator of the plurality of evaporators. The modular cooling unit is mounted in a rack sized for receiving an additional modular cooling unit and has a ram air inlet connected to a ram air source. The first modular cooling unit is in fluid communication with the ram air inlet when received in the rack. The method comprises mounting the additional modular cooling unit in the rack so the additional modular cooling unit is in fluid communication with the ram air inlet and connecting the additional modular cooling unit to a second evaporator to cool a second portion of the aircraft.

In still another aspect, the present invention includes a modular expandable cooling system for aircraft. The cooling system comprises a plurality of evaporators positioned in the aircraft for cooling corresponding portions of the aircraft. The system also includes a rack positioned in the aircraft in communication with a ram air source. The rack has a ram air inlet in fluid communication with the ram air source sized for receiving a plurality of modular cooling units. Further, the system comprises a plurality of modular cooling units mounted in the rack. Each unit supplies refrigerant to a corresponding evaporator. Each unit includes a housing sized for receipt in the rack, a ram air inlet located on the housing for receiving ram air from the ram air inlet when the unit is received in the rack, a ram air outlet positioned downstream from the ram air inlet for exhausting spent ram air from the unit, a refrigerant inlet connectable to an outlet of the evaporator when the unit is received in the rack, and a refrigerant outlet connectable to an inlet of the evaporator when the unit is received in the rack. Each unit also includes a condenser mounted in the housing in fluid communication with the ram air inlet having an outlet in fluid communication with the refrigerant outlet and an inlet. The unit has a compressor mounted in the housing downstream from the condenser having an outlet in fluid communication with the condenser inlet and an inlet and an accumulator having an outlet in fluid communication with the compressor inlet and an inlet in fluid communication with the unit refrigerant inlet.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
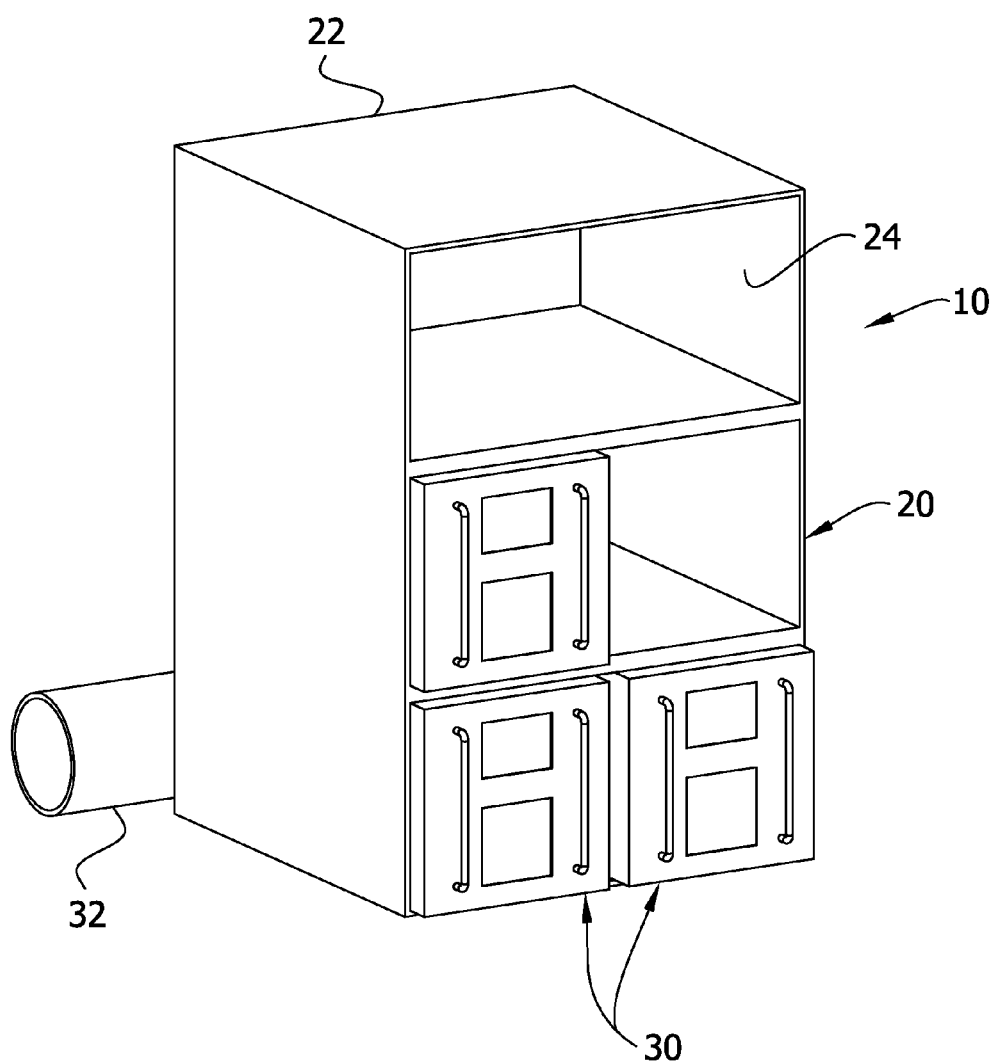
FIG. 1 is a perspective of one embodiment of a rack and modular cooling units of the present invention.

Referring to FIG. 1, a modular expandable cooling system of the present invention is designated in its entirety by the reference number 10. The cooling system 10 includes a rack, generally designated by 20, having an enclosure 22 divided into a plurality of cooling unit stations 24, each of which is sized and shaped for receiving a standardized modular cooling unit, generally designated by 30, as will be described in further detail below. Although the rack 20 is illustrated as having six stations 24, those skilled in the art will appreciate that the rack may have other numbers of stations without departing from the scope of the present invention. A duct 32 on one side of the rack 20 delivers ram air to the rack. The duct 32 delivers the ram air to an inlet 34 (FIG. 2) at each station 24. The duct 32 carries the ram air from a ram air source (not shown) taken from a leading exterior surface of the aircraft. Although the rack 20 and duct 32 may be made of other materials without departing from the scope of the present invention, in one embodiment the rack and duct are made from aluminum sheet metal or composite material.

Figure 2:
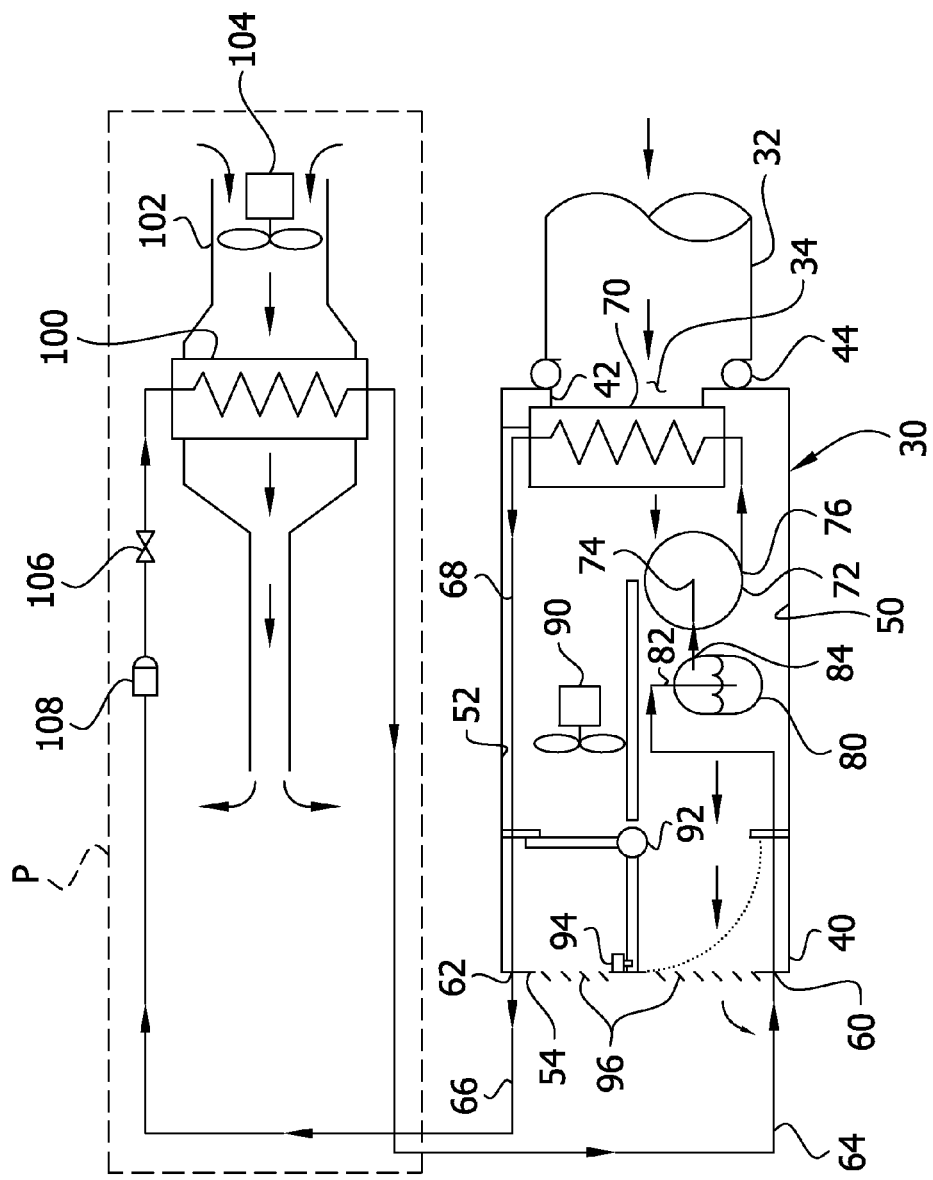
FIG. 2 is a schematic of a modular cooling unit in flight mode connected to a cooling system on board an aircraft.

As illustrated in FIG. 2, each modular cooling unit 30 includes a housing 40 sized for receipt in a cooling unit station 24 of the rack 20. Although the housing 40 may have other sizes without departing from the scope of the present invention, in one embodiment the housing is about eleven inches tall, about ten inches wide, and about twenty inches long. Although the housing 40 may be made of other materials without departing from the scope of the present invention, in one embodiment the housing is made from aluminum sheet metal. A ram air inlet 42 is located on one end of the housing 40. The ram air inlet 42 receives ram air from the rack inlet 34 when the unit 30 is positioned in the rack 20. A seal 44 is positioned between the ram air inlet 42 and the rack inlet 34. When the housing 30 is positioned in the station 24 of the rack 20, the ram air inlet 42 of the housing 30 automatically seats against the seal 44 to prevent air loss at the interface between the components. Downstream from the ram air inlet 42, the housing 40 is divided into two passages. One passage is a main passage 50, which carries air during flight, and the other passage is an auxiliary passage 52, which carries air when the aircraft is on the ground. A ram air outlet 54 is provided on the housing 40 downstream from the ram air inlet 42, main passage 50, and auxiliary passage 52 for exhausting spent ram air from the unit 30. Although the ram air outlet 54 may dump used ram air immediately adjacent the rack 20 as illustrated in FIG. 1, it is envisioned that a discharge duct (not shown) may be connected to the outlet side of the rack to carry spent ram air away from the rack.

As further illustrated in FIG. 2, the housing 40 includes a refrigerant inlet 60 and a refrigerant outlet 62, which direct refrigerant into and out of the housing. Although other refrigerants may be used without departing from the scope of the present invention, in one embodiment the refrigerant is HFC-134a or HFC-236a. Although the inlet 60 and outlet 62 may take other forms, in one embodiment the inlet and outlet are conventional tubing couplings for connecting the unit 40 to external refrigerant lines 64, 66. A refrigerant line 68 extends through the housing 40 from the refrigerant inlet 60 to the refrigerant outlet 62 for carrying refrigerant through the modular cooling unit 30. A condenser 70 is mounted inside the housing 40 immediately downstream from the ram air inlet 42 so ram air passes over the condenser as the air enters the modular cooling unit 30. The refrigerant line 68 carries refrigerant from the refrigerant inlet 60 to the condenser 70 and from the condenser to the refrigerant outlet 62. A compressor 72 is mounted in the main ram air passage 50 of the housing 40 downstream from the condenser 70. The compressor 72 compresses the refrigerant so it becomes a high pressure, high temperature vapor. The refrigerant line 68 delivers gaseous refrigerant to an inlet 74 of the compressor 72 and delivers pressurized refrigerant from an outlet 76 of the compressor 72 to the condenser 70. In addition, an accumulator 80 is mounted in the main passage 50 of the housing 40. The accumulator 80 has an inlet 82 and an outlet 84 that are connected to the refrigerant line 68 between the refrigerant inlet 60 and the compressor 72. The accumulator 80 allows the refrigerant to pool in a liquid state at a bottom of an internal reservoir but deliver the refrigerant as a gas to the compressor 72.

Figure 3:
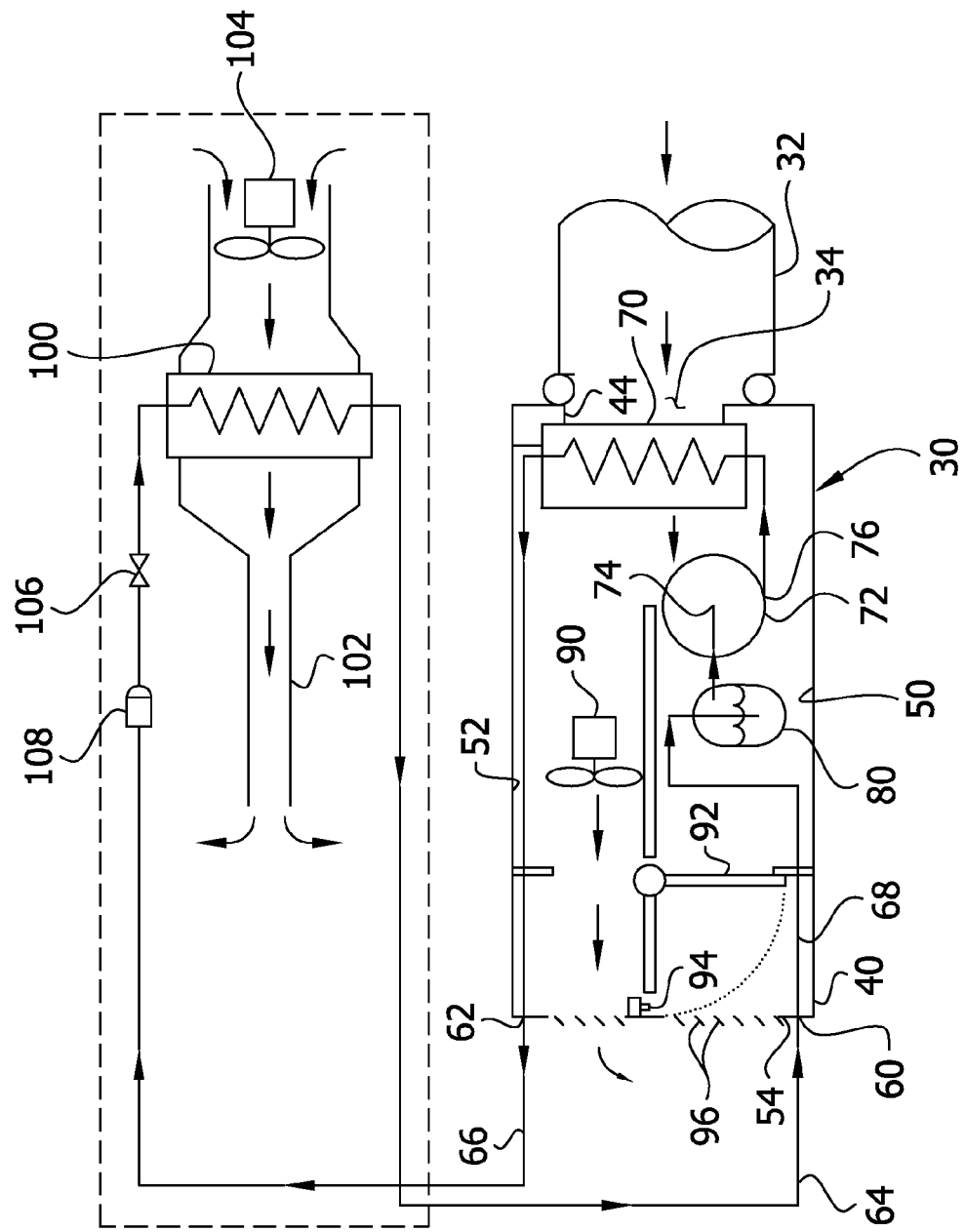
FIG. 3 is a schematic of the modular cooling unit in ground mode connected to the cooling system on board the aircraft.

A fan 90 is mounted in the auxiliary passage 52 for pulling air through the ram air inlet 42 and over the condenser 70 when the aircraft is on the ground. A valve 92 mounted at downstream ends of the main and auxiliary passages 50, 52 changes position from an in-flight position or flight mode as illustrated in FIG. 2 to an on-ground position or ground mode as illustrated in FIG. 3. When the valve 92 is oriented in the in-flight position, ram air is permitted to pass through the main passage 50 and blocked from traveling through the auxiliary passage 52. When the valve 92 is oriented in the on-ground position, ram air is blocked from traveling through the main passage 50 and permitted to pass through the auxiliary passage 52. A switch 94 may be provided adjacent the valve 92 for sensing the orientation of the valve, energizing the fan 90 when the valve is in the on-ground position and de-energizing the fan when the valve is in the in-flight position. Check louvers 96 are provided at the downstream ends of the main passage 50 and auxiliary passage 52 to prevent air from flowing into the housing 40 through the ram air outlet 54.

As further shown in FIG. 2, the external refrigerant lines 64, 66, carry the refrigerant to and from an evaporator 100 mounted in the aircraft closer to a portion of the aircraft where cooling is needed. For example, when a new piece of equipment demanding additional cooling is installed in the aircraft, the evaporator 100 may be positioned in a duct 102 positioned to deliver cooling air to that portion P of the aircraft holding the equipment. A fan 104 mounted in the duct 102 upstream from the evaporator 100 blows air over the evaporator 100 to cool the air before being delivered to the portion of the aircraft where cooling is needed. An orifice 106 is positioned along the refrigerant line 66 leading to the evaporator 100 for expanding the refrigerant to a gas state. As the refrigerant expands, its temperature drops. A filter 108 mounted along the refrigerant line 66 between the housing refrigerant outlet 62 and the orifice 106 traps contaminants before the refrigerant enters the orifice.

Ram air entering the modular cooling unit 30 passes over the condenser 70 to cool refrigerant passing through the condenser. When the unit 30 is in flight mode, the ram air passes through the main passage 50, cooling the compressor 72 and ultimately exhausting from the unit through the ram air outlet 54. When the unit 30 is in ground mode, the fan 90 in the auxiliary passage 52 is energized and the valve 92 is oriented as shown in FIG. 3, to pull air from the ram air inlet 42 across the condenser 70, cooling the refrigerant passing through the condenser. The used ram air continues through the auxiliary passage 52, ultimately exhausting from the housing 40 through the ram air outlet 54.

Cooled liquid refrigerant exiting the condenser 70 is delivered to the location on-board the aircraft where cooling is needed, passing through the filter 108 and then through the orifice 106 where the refrigerant expands and its temperature drops. The expanded cold refrigerant passes through the evaporator 100 to cool air passing over the evaporator. A fan 104 mounted in the duct 102 blows air over the evaporator 100. After passing through the evaporator 100, the refrigerant travels through the refrigerant line 64 back to the particular modular cooling unit 30, where it passes through the accumulator 80 and compressor 72 before being delivered to the condenser 70 where the cooling cycle begins over again.

As will be appreciated by those skilled in the art, when the cooling system must be expanded to provide additional cooling capability when handling increased heat loads caused by additional or upgraded aircraft accessories, an additional modular cooling unit 30 may be installed in the rack 20. When installed, the inlet 42 of the cooling unit 30 engages the seal 44 in the rack 20 to seal the ram air inlet to the duct 32. The refrigerant inlet 60 and refrigerant outlet 62 of the added cooling unit 30 is connected to refrigerant lines 64, 66, respectively, carrying refrigerant to the specific portion P of the aircraft where cooling is needed. As will be appreciated by those skilled in the art, the added cooling unit may be identical to one of the existing cooling units in the rack or have a different internal configuration or cooling capacity.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A modular expandable cooling system for use on aircraft having an on-board evaporator through which refrigerant circulates to cool a portion of the aircraft, the cooling system comprising:
    a rack sized for receiving a plurality of modular cooling units and having a rack inlet connected to a ram air source taken from an exterior surface of the aircraft; and
    one of the plurality of modular cooling units including:
        a housing sized for receipt in the rack and having a main passage and an auxiliary passage adjacent to the main passage;
        a ram air inlet located on the housing for receiving ram air from the rack inlet when the unit is received in the rack;
        a ram air outlet positioned downstream from the ram air inlet for exhausting spent ram air from the unit;
        a valve mounted at a downstream end of the main passage and auxiliary passage and being movable between an in-flight position and a ground position, the in-flight position blocking ram air through the auxiliary passage and permitting ram air through the main passage, the ground position blocking ram air through the main passage and permitting ram air through the auxiliary passage;
        a refrigerant inlet connectable to an outlet of the evaporator when the unit is received in the rack;
        a refrigerant outlet connectable to an inlet of the evaporator when the unit is received in the rack;
        a condenser mounted in the housing immediately downstream of the ram air inlet such that ram air passes over the condenser and cools refrigerant passing through the condenser as the ram air enters the modular cooling unit, the condenser having an outlet and an inlet, the condenser outlet being in fluid communication with the refrigerant outlet;
        a compressor mounted in the main passage downstream from the condenser and the ram air inlet and being cooled by the ram air when the valve is in the in-flight position, the compressor having an outlet and an inlet, the compressor outlet being in fluid communication with the condenser inlet;
        an accumulator mounted in the main passage downstream from the ram air inlet, the accumulator having an outlet in fluid communication with the compressor inlet and an inlet in fluid communication with the refrigerant inlet.

2. The modular expandable cooling system as set forth in claim 1 wherein the modular cooling unit is a first modular cooling unit, and the system further comprises a second modular cooling unit including:
    a housing sized for receipt in the rack;
    a valve mounted at a downstream end of the main passage and auxiliary passage and being movable between an in-flight position and a ground position;
    a ram air inlet located on the housing for receiving ram air from the ram air inlet when the unit is received in the rack;
    a ram air outlet positioned downstream from the ram air inlet for exhausting spent ram air from the unit;
    a refrigerant inlet connectable to an outlet of the evaporator when the unit is received in the rack;
    a refrigerant outlet connectable to an inlet of the evaporator when the unit is received in the rack;
    a condenser mounted in the main passage downstream from the condenser and the ram air inlet and having an outlet in fluid communication with the refrigerant outlet;
    a compressor mounted in the main passage downstream from the condenser and the ram air inlet and having an outlet in fluid communication with the condenser inlet;
    an accumulator mounted in the main passage downstream from the ram air inlet and having an outlet in fluid communication with the compressor inlet and an inlet in fluid communication with the refrigerant inlet.

3. The modular expandable cooling system as set forth in claim 2 wherein the second modular cooling unit has a different cooling capacity than the first modular cooling unit.

4. The modular expandable cooling system as set forth in claim 1 further comprising a fan mounted in the auxiliary passage selectively operable during ground operation.

5. The modular expandable cooling system as set forth in claim 1 further comprising check louvers downstream from the accumulator for preventing air from flowing in through the ram air outlet.

6. The modular expandable cooling system as set forth in claim 1 in combination with the aircraft on-board evaporator.

7. The modular expandable cooling system as set forth in claim 6 wherein the evaporator is mounted in a cooling duct, and the system further comprises a cooling fan mounted in the cooling duct upstream from the evaporator for directing air over the evaporator to cool the air.

8. The modular expandable cooling system as set forth in claim 7 further comprising:
    a refrigerant line extending between the housing refrigerant outlet and the evaporator inlet;
    an orifice positioned along the refrigerant line; and
    a filter positioned along the refrigerant line between the housing refrigerant outlet and the orifice.

9. A method of increasing cooling system capacity on an aircraft having a plurality of evaporators through which refrigerant circulates to cool a corresponding portion of the aircraft, the aircraft including a first modular cooling unit connected to a first evaporator of the plurality of evaporators, the modular cooling unit having a housing having a main passage and an auxiliary passage adjacent to the main passage and including a valve mounted at a downstream end of the main passage and auxiliary passage and being movable between an in-flight position and a ground position, the in-flight position blocking ram air through the auxiliary passage and permitting ram air through the main passage, the ground position blocking ram air through the main passage and permitting ram air through the auxiliary passage, the housing being mounted in a rack sized for receiving an additional modular cooling unit and having a ram air inlet connected to a ram air source taken from an exterior surface of the aircraft, the first modular cooling unit being in fluid communication with the ram air inlet when received in the rack and including a ram air outlet downstream from the ram air inlet, a refrigerant inlet and outlet respectively connectable to the first evaporator outlet and inlet, a condenser mounted in the housing immediately downstream of the ram air inlet such that ram air passes over the condenser and cools refrigerant passing through the condenser as the ram air enters the modular cooling unit, the condenser having an outlet and an inlet, the condenser outlet being in fluid communication with the refrigerant outlet, a compressor mounted in the main passage downstream from the condenser and the ram air inlet and being cooled by the ram air when the valve is in the in-flight position, the compressor having an outlet and an inlet, the compressor outlet being in fluid communication with the condenser inlet, an accumulator mounted in the main passage downstream from the condenser and the ram air inlet, the accumulator having an outlet in fluid communication with the compressor inlet and an inlet in fluid communication with the refrigerant inlet, the method comprising:

mounting the additional modular cooling unit in the rack so the additional modular cooling unit is in fluid communication with the ram air inlet; and connecting the additional modular cooling unit to a second evaporator to cool a second portion of the aircraft.

10. A modular expandable cooling system for aircraft, the cooling system comprising:

a plurality of evaporators positioned in the aircraft for cooling corresponding portions of the aircraft a rack positioned in the aircraft in communication with a ram air source taken from an exterior surface of the aircraft, the rack having a ram air inlet in fluid communication with the ram air source and being sized for receiving a plurality of modular cooling units; and a plurality of modular cooling units mounted in the rack, each unit of said plurality of cooling units supplying refrigerant to a corresponding evaporator of said plurality of evaporators and including:

a housing sized for receipt in the rack and having a main passage and an auxiliary passage adjacent to the main passage;

a valve mounted at a downstream end of the main passage and auxiliary passage and being movable between an in-flight position and a ground position, the in-flight position blocking ram air through the auxiliary passage and permitting ram air through the main passage, the ground position blocking ram air through the main passage and permitting ram air through the auxiliary passage;

a ram air inlet located on the housing for receiving ram air from the ram air inlet when the unit is received in the rack;

a ram air outlet positioned downstream from the ram air inlet for exhausting spent ram air from the unit;

a refrigerant inlet connectable to an outlet of the evaporator when the unit is received in the rack; a refrigerant outlet connectable to an inlet of the evaporator when the unit is received in the rack;

a condenser mounted in the housing immediately downstream of the ram air inlet such that ram air passes over the condenser and cools refrigerant passing through the condenser as the ram air enters the modular cooling unit, the condenser having an outlet and an inlet, the condenser outlet being in fluid communication with the refrigerant outlet;

a compressor mounted in the main passage immediately downstream from the condenser and the ram air inlet and being cooled by the ram air when the valve is in the in-flight position, the compressor having an outlet in fluid communication with the condenser inlet and an inlet;

an accumulator mounted in the main passage downstream from the ram air inlet, the accumulator having an outlet in fluid communication with the compressor inlet and an inlet in fluid communication with the refrigerant inlet.

11. The modular expandable cooling system as set forth in claim 10 wherein at least one unit of said plurality of modular cooling units has a different cooling capacity than another unit of said plurality of modular cooling units.

12. The modular expandable cooling system as set forth in claim 10 further comprising a fan mounted in the auxiliary passage selectively operable during ground operation.

13. The modular expandable cooling system as set forth in claim 12 further comprising check louvers downstream from the accumulator for preventing air from flowing in through the ram air outlet.

* * * * *